United States Patent

McGaughey et al.

[15] 3,646,651

[45] Mar. 7, 1972

[54] ABRASION AND CORROSION RESISTANT COMPOSITE STRUCTURAL MATERIALS AND THE LIKE

[72] Inventors: Robert S. McGaughey, Indiana; Paul Simboli, Pittsburgh, both of Pa.

[73] Assignee: McCreary Tire & Rubber Company, Indiana, Pa.

[22] Filed: Oct. 29, 1965

[21] Appl. No.: 505,692

[52] U.S. Cl. ................................................. 29/130, 29/132
[51] Int. Cl. ......................................................... B21b 31/08
[58] Field of Search ...................... 29/130, 132; 264/DIG. 53

[56] References Cited

UNITED STATES PATENTS

| | | | |
|---|---|---|---|
| 2,597,858 | 5/1952 | Freelander | 29/132 X |
| 2,614,058 | 10/1952 | Francis | 156/171 |
| 2,804,678 | 9/1957 | Rockoff | 29/130 X |
| 2,925,088 | 2/1960 | Roscoe | 29/130 X |
| 2,961,362 | 11/1960 | Landes | 156/154 |
| 2,989,966 | 6/1961 | Marshall | 29/130 X |

*Primary Examiner*—Billy J. Wilhite
*Attorney*—Buell, Blenko & Ziesenheim

[57] ABSTRACT

Structural materials, specifically rolls for use in steel-fabricating processes, are disclosed for use in corrosive and erosive environments. In one arrangement the roll includes a base member or substrate to which is adhered a resin coating. A reinforcing mat or cloth is adhered to and partially embedded in the resin coating, before the latter hardens. A second resin layer is coated upon and partially impregnates the reinforcing mat. A second mat is then adhered to the second resin layer in a similar manner followed by a third coating of the resin material. A greater or lesser number of resin layers and reinforcing mats can be employed as required. The specific materials employed for the resin or plastic layers and the reinforcing cloths or mats can be varied according to the specific environment in which the roll will be used. For example, in presence of hydrofluoric acid the reinforcing mat may be Dynel cloth. For resilient contact with the work a suitable elastomeric layer is placed over the last resin or plastic coating.

26 Claims, 3 Drawing Figures

PATENTED MAR 7 1972

INVENTORS
Robert S. McGaughey &
Paul Simboli

ABRASION AND CORROSION RESISTANT COMPOSITE STRUCTURAL MATERIALS AND THE LIKE

The present invention relates to composite structural materials or means and the like offering exceptional corrosion and/or abrasion resistance, and more particularly to materials of the character described having in addition means for structurally reinforcing the base surfaces of such materials. The composite structural means can be arranged, pursuant to the invention, for use in a wide range of varying environmental conditions, typified by varying abrasive conditions, elevated temperatures, or any type of chemically corrosive conditions such as a relatively high or relatively low pH environment.

The invention finds extensive application in chemical-processing equipment, such as for the construction of tanks, ducts, conveyors, weirs and the like for handling alkalis, acids and other corrosive materials, which may in addition contain abrasive matter or otherwise involve erosive flow velocities of the fluid, per se. Structural materials of the invention, for example, can be applied as one or more coatings, or as a laminant, to a substrate such as fan blades and ductwork used in a ventilating system for exhausting hot acid tanks or the like, or the composite materials can be used in the construction of, or as coatings on acid condensers or scrubbers coupled to the outlet of the ventilating system to prevent release of acid fumes to the atmosphere. The structural materials of the invention can be utilized moreover for coating or facing various rolls used in certain steel-fabricating and other processes where the rolls are exposed to extremely corrosive environments as well as to the abrasive action of the moving steel material.

Although many attempts have been made to protect the base materials (usually steel or steel alloys) of the aforementioned and other equipment from the aforementioned corrosive or abrasive environments or both, expedients such as glass, plastic and rubber coatings or linings have largely proven to be unsatisfactory.

In steel mill applications, for example in handling steel strip and the like, large numbers of the aforementioned rolls are utilized for guiding, tensioning, and otherwise engaging the strip during rolling and pickling operations. During the strip-handling operations such rolls are subjected to the various strong pickling agents and other corrosive compounds employed in pickling or cleaning or in otherwise treating the steel strip for various applications. These strong cleaning agents are unavoidably carried to and coated on the various handling rolls as the strip is moved thereover or therebetween as it proceeds along the length of the rolling mill, pickling line or the like.

The roll body is usually fabricated from a structural material such as carbon steel, which can be hollow as noted below, and in order to protect the rolls from attack by the aforementioned cleaning or pickling agents, such as hydrochloric, sulfuric, and hydrofluoric acids, it is customary to provide an acid-resistant covering for the roll, such as Neoprene acid-resistant rubber or other elastomeric material. The rubber covering also affords increased frictional engagement between the roll and the work material. Although the application of the Neoprene coating initially functions satisfactorily for the purpose intended, the roll when thus coated, unavoidably undergoes minor damage to its Neoprene coating resulting in rupture thereof and providing access of acid to the steel core of the roll. The steel core is then eaten away by the acid and is consequently damaged beyond repair usually before the coating damage is discovered owing to the fact that small ruptures in the Neoprene coating are not readily apparent. Although the Neoprene covering can be removed and replaced by a new Neoprene covering as required, usually, however, restoration of the strip-handling rolls in this manner is not done as long as such ruptures are not obvious and the Neoprene covering is adequately performing its function of providing the proper frictional engagement of the rolls with the steel strip.

Because no great force is applied to such strip-handling rolls, even in those applications where a pair of such rolls are employed for pinch rolls or the like, it is the usual practice to utilize a hollow steel core for the rolls in order to reduce the weight and expense thereof. In order to minimize the thickness of the steel shell or core of the roll it is desirable to provide a tough, hard, abrasion-resistant coating upon the steel shell in order to reinforce the latter and to minimize surface wear. Such coating, when applied to the strip-handling roll in accordance with the invention, affords a suitable base surface for the application for one or more subsequently applied protective coverings, also provided by the invention, or alternatively, the last-mentioned protective coatings of the novel strip-handling roll or the like can be provided directly upon the steel base or other core material of the roll, as pointed out in greater detail hereinafter.

Accordingly, the novel, corrosion-resistant roll, or other composite structural member, as disclosed herein, includes a core or substrate made of steel or other structural material which, after suitable surface treatment, can be reinforced, with a suitably treated resin material such as a polyester, phenolic, or epoxy resin, depending upon the application thereof, which is in turn reinforced with a mat or cloth of fibrous material such as fiber glass, polyvinyl-type fibers such as dynel (polyvinyl chloride acrlyonitrile copolymer) and Orlon (polyacrylonitrile), polyester fiber, such as Dacron (commonly designating terephthalate compounds, a specific example of which is the product made by the condensation of dimethyl terephthalate and ethylene glycol) polyamide such as Nylon (polyhexamathylene adipamide) or naturally occurring fibers such as asbestos and crocidilite (blue asbestos). As used herein the term "mat" when employed alone is inclusive of "cloth." The particular fiber and resin selected will depend upon the corrosive material or materials encountered. For example, in strong acid environments such as sulfuric or hydrochloric, a resin such as polyester, reinforced with fiber glass can be employed. For other acid environments, such as hydrofluoric which readily attacks glass, a resin such as polyester, reinforced with dynel cloth, or other polyvinyl copolymer fiber, or with a mineral fiber such as crocidilite or asbestos, can be employed.

In steel strip handling operations, however, where hydrofluoric and other acids are encountered, the last-mentioned protective Dynel or crocidilite covering can be provided for the roll either upon the aforementioned fiber glass or other fiber reinforcement or directly upon the exposed or base core structure of the roll. The same can be applied to chemical-processing equipment as tank linings or the like. The latter protective covering can include, for an example, a corrosion-resistant resin layer reinforced by Dynel cloth, which when thus applied, affords complete corrosion resistance to the roll, including immunity to attack by hydrofluoric acid and other acids, and moreover, offers superior abrasion resistance in comparison to that provided by the aforementioned impregnated fiber glass when used.

Depending upon the application of the invention, a resilient covering is adhered to the reinforced resin coating to enhance the abrasion or erosion resistance thereof. In the case of the aforementioned roll, when the roll is to be used in steel strip handling operations, the resilient covering promotes the frictional engagement thereof with the steel strip.

The resilient material can be a material selected form the from the group consisting of elastomeric materials such as silicone, polyurethane, Neoprene(poly-2 chloro 1, 3 butadiene, more commonly known as polychloroprene), natural rubber, Hypolon (chlorosulfonated polyethylene rubber), butyl (including chlorobutyl and bromobutyl), Thiokal (copolymer of ethylene-propylene-cyclopentadiene), and butadiene (including SBR, nitrile, and acrylonitrile) rubbers. The particular elastomer selected will depend upon the environment to which the structural material of the invention will be subjected and the selection will hinge primarily upon the factors of abrasion, friction, pH, and temperature. When, for example the structural material is used in connection with the aforementioned steel strip handling roll an acid-resistant Neoprene can be used.

In those applications where, for example, hydrofluoric acid is not encountered, one of the aforementioned elastomers can be applied directly upon the reinforced plastic covering containing any of the aforementioned fibers or equivalent. Where the utmost reinforcement is not required, a singe Dynel or blue asbestos layer can be applied directly to the core structure of the roll, followed by application of the acid-resistant Neoprene covering, for use in the hydrofluoric acid environment. Where the composite structural material of the invention is to be employed to maximum advantage, i.e., the combined features of structural and surface reinforcement, optimum abrasion resistance, and optimum acid resistance, a laminant of the aforementioned coverings can be employed, with a multilayered resin covering reinforced for example, with fiber glass being first applied, followed by one or more resin layers reinforced with Dynel or crocidilite fiber and then the acid-resistant Neoprene covering in succession. Specific details for the application of the aforementioned coverings for rolls and for use with other reinforced and corrosion-resistant structures will be set forth hereinafter.

These and other objects, features, and advantages of the invention, together with structural details thereof, will be elaborated upon during the forthcoming description of certain presently preferred embodiments of the invention, together with presently preferred means of practicing the same.

In the accompanying drawings, there are shown certain presently preferred embodiments of the invention together with presently preferred means of practicing the same, wherein.

Figures 1, 3:
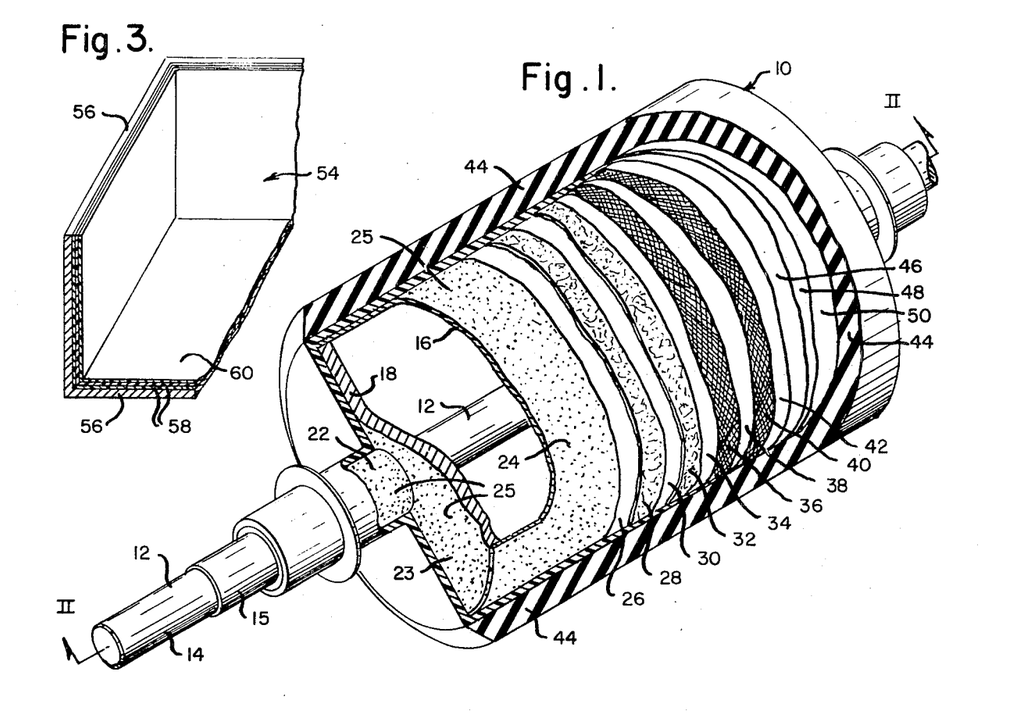
FIG. 1 is an isometric view of one form of roll structure arranged to utilize the composite abrasion and corrosion resistant structure of the invention, with portions thereof being cut away in order to show the invention more clearly.
FIG. 3 is a partial, isometric view of another form of the composite structure of the invention, used here in connection with chemical-processing equipment such as a tank for use with highly abrasive and corrosive materials.
Figure 2:
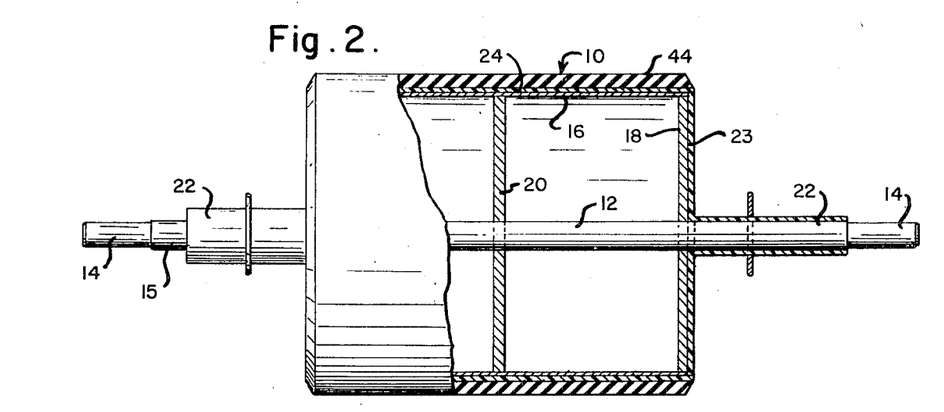
FIG. 2 is a longitudinally sectioned view of the roll structure of FIG. 1, taken generally along reference line II—II thereof.

Referring now more particularly to FIGS. 1 and 2 of the drawings, the exemplary form of the invention illustrated therein includes a roll 10 having a number of reinforcing and protective coverings thereon. In this arrangement the roll 10 includes a shaft 12 extending there through, as better shown in FIG. 2, and journaled at each end as denoted by the reference characters 14 for mounting in suitable bearings therefor (not shown) of equipment for supporting and rotating the roll 10.

An additional journaled portion 15 is provided adjacent one of the bearing journals 14 for mounting a drive pulley, sprocket, or the like for rotating the roll 10. In this example, the core structure of the roll 10 includes a hollow tubular member 16, preferably of right cylindrical configuration, supported at its ends by appropriately shaped annular discs 18 which in turn are secured to the shaft 12 and to the respective ends of the tubular member 16, as by welding. Desirably, the core structure thus far described is reinforced by one or more additional annular discs 20 of similar shape, with one such disc 20 being shown in FIG. 2 and secured to the shaft 12 and to the midcircumferential region of the cylinder 16.

Before the application of the coatings or coverings presently to be described, the roll journals 14 and 15 are protected from damage by wrapping with masking or friction tape (not shown), and the remaining portions of the roll 10, including the exposed shaft portions or shanks 22, the end faces or end disc outer surfaces 23 of the roll, and the cylindrical work surface 24 thereof are treated to afford proper adhesion of the initial covering thereto. In this example, the aforementioned surfaces are first wiped with a suitable solvent such as chlorothane to remove any residual deposits of grease and oil. Following degreasing in this fashion, the portions of the roll 10 to be coated are then sand or grit blasted or otherwise treated with a suitable abrasive process to remove all traces of rust and corrosion from these surfaces and to roughen the surfaces as denoted by reference character 25 (FIG. 1), in order to enhance coating adhesion thereto. If the roll 10 when thus treated must be permitted to stand for a period of time following grit blasting or the like and before the application of the initial covering, the sandblasted or otherwise roughened surfaces 25 should be washed with acetone before proceeding to the first coating application.

Following the roughening operation, an initial, corrosion-resistant resin coating 26 is applied to the sandblasted surfaces as by painting or spraying. As noted above, a polyester, phenolic or expoxy resin is suitably utilized for this purpose. Prior to the resin application, a polyester, phenolic or expoxy primer coating, respectively, of a known slow-curing variety, can be applied, depending upon the particular type of the aforemetioned resins which is used. For optimum resistance to acids including hydrofluoric, a polyester resin such as Hetron 197—Hooker Chemical, N. Tonawanda, N. Y. is desirable and can be applied over the aforementioned polyester primer coating. The primer coat can be omitted where the roll or other base member is coated immediately after grit-blasting. The polyester, epoxy, or phenolic resin desirably is activated in the conventional manner for either air or heat curing. Such resins are supplied conventionally for these purposes as two-part systems including the respective activators. Frequently, however, polyester resins are supplied with an air-curing activator, while the epoxy and phenolic resins are activated for heat curing.

Before the resin coating has hardened, a layer of one of the aforementioned fibrous reinforcing materials is placed over the freshly applied resin. The thickness and character of the fibrous material, which in this example is fiber glass, can be varied depending upon the application of the invention and the required degree of toughness and surface reinforcement to be imparted to the roll 10. In this example of the invention, a mat 28 of chopped fiber glass is employed, with a weight of about 1½ ounces per square foot of mat. The mat is applied to the work and end surfaces 23, 24 of the roll and to the exposed shanks 22 of the shaft 12. At the junctions between portions or discrete segments of the aforementioned mat, a 1- to 2-inch overlap desirably is provided to prevent loss of reinforcement in these areas. Depending upon the strength or amount of reinforcement desired, the number of layers in the laminant can be carried and fiber glass mat weighing between about ¾ ounce and 10 ounces per square foot can be used.

A second quantity of the aforementioned corrosion-resistant resin is then applied to the fiber glass mat and, while still fluid, is thoroughly worked into and over the mat to wet completely the fibers thereof, to remove any traces of air bubbles therefrom, and to leave a coating 30 of resin thereon. A second layer 32 of one of the aforesaid fibrous reinforcing materials is immediately applied to the second resin coating 30. The weight and configuration of the fibrous material, which can also be fiber glass in this example, in the second layer 32 thereof likewise can be varied depending upon the application of the invention. In this example, a thinner mat of chopped fiber glass is employed, with a weight of about ¾ ounce per square foot, and is applied to the second resin coating 30 in the manner set forth above in connection with the initial fiber glass layer 28. The weight of the mat 32 can also be varied between ¾ ounce and 10 ounces as noted above with reference to the fiber glass mat 28.

Following this application, a third coating 34 of corrosion-resistant material, or resin such as that noted above, is applied to the fiber glass layer 32 and worked into the interstices thereof and coated thereover as described previously. While the resin coating 34 is still fluid, a third layer 36 of one of the aforementioned fibrous reinforcing materials for example, a fiber glass material, if additional reinforcement is required, is then applied while the resin coating 34 is still fluid. The fiber glass material 36 can be applied as described above, either in connection with the first fiber glass layer 28 or the second layer 32 thereof, or as utilized in this example, the fiber glass material can be applied as a woven fiber glass cloth weighing about 6 ounces per square yard. The fiber glass cloth 36 is then impregnated with a succeeding layer 38 of corrosion-resistant resin in the manner described in connection with the resin coatings 30 and 34, in order to reinforce the associated plastic layer including the resin coatings 34–38. It is contemplated, of course, that the fiber glass will be provided with a suitable, conventional fiber surface finish selected for compatibility for use with the selected one of the aforementioned resins.

The arrangement described thus far completes the reinforcement covering for the steel core 16–18 of the roll 10. It is to be understood, of course, that a greater or lesser number of reinforced plastic layers including the aforementioned associated resin coatings can be employed in place of that shown in the drawings. It is also contemplated that a lesser number of reinforced plastic layers can be applied to the steel end discs 18 and to the shaft shanks 22 than to the work surface 24 of the roll 10, as represented by the cylinder 16. Depending upon the application of the invention and upon the particular corrosive environment in which the roll 10 or other composite structure, arranged in accord with the invention, is to be used one or more of the aforementioned fibrous materials can be substituted for fiber glass.

For example, in those applications wherein the roll 10 or other structure is exposed to corrosive materials which may attack glass or certain others of the fibrous materials such as hydrofluoric acid, a layer of Dynel cloth or of crocidilite fiber can be substituted for one or more of the outermost layers of the fiber glass material mentioned above, or alternatively all of the fiber glass material can be omitted and one or more layers of the Dynel cloth or crocidilite fiber can be substituted therefor. In the latter case, the Dynel fiber or crocidilite fiber can be applied directly to the initial resin coating 26.

In the present example, however, a layer of Dynel cloth 40 is applied to the last resin coating 38, before the latter has completely set up. Following this application a final coating 42 of the aforementioned resin is applied to the Dynel cloth covering 40 and worked into the interstices thereof and coated thereover in the manner described above in connection with the coverings of fiber glass material. As better shown in FIG. 2, the final reinforced plastic layer including the Dynel fiber 40 and the overlying resin coating 42 covers all exposed surfaces of the roll 10 including the work surface 24, the end faces 23, and the shanks 22. Thus, all exposed surfaces of the roll 10 are completely protected from attack by hydrofluoric acid or any other corrosive material. In those applications of the invention wherein the roll 10 or other structural member can be utilized without a frictional or yieldable work surface or where abrasional conditions are not severe, the roll 10 or other structural member can be utilized as coated in accordance with the description thus far set forth, after machining or turning to ensure symmetry about its rotational axis.

However, in applications, such as in steel strip rolling or pickling lines, where a pair of rolls 10 are used as pinch rolls or where otherwise the roll must yieldably or frictionally engage the material, a final layer of one of the aforementioned elastomers or other suitably resilient plastic is applied to the work surfaces of the roll 10, as better shown in FIG. 2. In order to afford an additional measure of corrosion resistance, the covering 44 can be formed from Neoprene acid-resistant rubber. However, as seen from FIG. 2, it is not necessary to apply the yieldable covering 44 to the end faces 23 of the roll 10 or to the shanks 22, as the end faces and shanks are adequately protected by the previously described reinforced plastic coverings on these area.

The resilient covering 44 can be applied as follows: After the last resin coating 42 has hardened, the surface thereof in the area where the resilient covering 44 is to be applied for example the roll work surface 24 is washed with acetone. After the acetone has dried, the reinforced resin layer 40–42 is grit blasted to an extent preferably to expose some of the reinforcing fiber 40. Then the composite structure is subjected to a rough sanding to improve the regularity of the coating surface, or in the case of the roll 10, is rough machined or turned to ensure symmetry, as pointed out above. Certain of the aforementioned elastomers, for example, polyurethane rubber, will then bond securely to any of the aforesaid resins (polyester, phenolic, or expoxy) without further surface treatment of the reinforced resin layer. This bonding is made more secure by adherence to the exposed reinforcing fiber. On the other hand, Neoprene rubber can be bonded to the thus prepared resin surface, for example, by first coating with a solution of Neoprene rubber in toluol. Natural, nitrile, or silicone rubber can be adhered by first applying a similarly suitable elastomeric material dissolved in a suitable solvent, to the roughened surface of the final, reinforced plastic layer 40–42.

In the latter case, a first coat of a suitable primer material 46 such as that sold under the trade name, Chemlock No. 205, Hughson Chem. Co., Erie, Pa.), is applied to the reinforced resin laminant. The solvent in the Chemlock primer may soften the resin material 42 on the surface of the last reinforced plastic covering. It has been found, however, that when the primer coat 46 is permitted to dry for a period of approximately 4 hours, that the surface of the roll 10 or other composite structure, when thus treated, again becomes very hard and tough. A second coating 48 of the Chemlock primer followed by a layer of a suitable cement material 50, such as that sold under the trade name, Chemlock No. 220, Hughson Chem. Co., ibid.), is then applied. Other known primers and cements can be used to the extent of compatibility with the resin and resilient or elastomeric materials.

The cement coat 50 and at least the second one of the primer coats 46, 48 are confined to the work surface 24 of the roll 10 as is the resilient layer 44. For the reason pointed out below, it is desirable in certain applications, to apply the first primer coat 46 to the entire portion of the last resin coating 42.

The first primer coat 46 protects the last resin layer 42 from further softening action by the solvents of the subsequently applied primer coat 48 and the cement coat 50 such that no further softening thereof occurs during the application of the second primer coat 48 or the cement coat 50. Therefore, in those applications wherein the roll 10 or other composite structure of the invention is to be utilized without a resilient covering 44, and where the roll as other composite structures may be exposed to the aforementioned solvents in addition to the aforementioned acid or other corrosive materials, at least one of the primer coats 46, 48 desirably is applied to the entire surface of the last resin layer 42 as a final coating.

In the case of the roll 10, after the covering 44 of resilient material, such as the aforementioned acid-resistant Neoprene, is applied thereto in a conventional manner, the roll 10 is then wrapped with cotton webbing (not shown) and placed for curing of the rubber in a steam autoclave or large oven, both of conventional construction. After curing in the aforementioned autoclave, the roll 10 is removed therefrom, unwrapped, and ground in a conventional roll-grinding machine (not shown) in order to ensure that the relatively thick resilient covering 44 is symmetrical about the rotational axis of the roll 10.

In order to prevent exposure of the roll end faces 23 and shanks 22 to the steam atmosphere during the aforementioned autoclave curing operation, the roll faces and shank portions of the roll 10 can be covered with a relatively thin layer of Neoprene material to prevent contact of the otherwise exposed reinforced plastic coatings on these areas of the roll by superheated steam, which otherwise would tend to delaminate the aforementioned coatings. Alternatively, the reinforced plastic covering can be applied separately to the end faces 23 and shank areas 22 after application of the coatings 26–50 to the work surface 24 of the roll 10 and after removal thereof from the aforementioned autoclave, when used.

Referring now to FIG. 3 of the drawings the composite abrasion and corrosion resistant structure of the invention is utilized in the construction of chemical processing equipment such as a tank 54 having in this example metallic side and bottom walls 56, which form the metallic substrate of the composite structure. One or more reinforced plastic layers 58 are coated upon the substrate or tank walls 56, which desirably are first roughened as described upon in connection with the roll 10 of FIGS. 1 and 2. Upon the innermost one of the plastic layers 58, a surface covering 60 of one of the aforementioned elastomers or other resilient plastic material is adhered. The materials for the elastomer coating 60 and the reinforced plastic coatings 58 can be selected from those set forth above, as determined by the application of the invention. For example, for strong mineral acid, such as hydrochloric, sulfuric or phosphoric, containing abrasive material the elastomer can be Hypolon or Neoprene, while a polyester resin reinforced with Dynel or fiberglass fiber can be employed. On the other hand, a strong alkali and abrasive mixture would necessitate an elastomer such as Neoprene or butyl, or Hypolon and a reinforced plastic such as epoxy resin with fiber glass or Orlon fiber embedded therein. For use in an oil or grease environment, a nitrile rubber can be utilized as the elastomeric covering on any of the aforementioned reinforced plastic coatings. Where abrasion resistance of the final or resilient coating is paramount, a butadiene rubber desirably is employed as the elastomeric covering. Natural rubber desirably is employed in those applications where frictional heat is developed in the final or resilient layer of the composite structure owing to the lower hysteresis properties of natural rubber. The aforementioned coverings 58–60 can be adhered to the tank walls 56 and successively to one another by the process as set forth above in connection with the roll 10 and FIGS. 1 and 2. Although a reinforced plastic laminant comprising two such coatings 58 has been illustrated, it is contemplated that a lesser or greater number thereof can be employed depending upon the application of the invention and attendant environmental conditions. Obviously, the foregoing examples are applicable to the aforedescribed roll and other equipment mentioned herein and their equivalents, depending upon the environmental applications thereof.

From the foregoing it will be apparent that novel and efficient forms of rolls, together with unique means for fabricating the same have been disclosed herein. While there have been shown and described certain presently preferred embodiments of the invention together with presently preferred means of practicing the same, it is to be distinctly understood that the invention is not limited thereto, but may be otherwise variously embodied and practiced within the scope of the following claims.

We claim:

1. A roll for use in a corrosive environment, said roll including a core structure forming part thereof, a corrosion-resistant resin layer adhered to said core structure, a layer of fiber glass material adhered to said resin layer, an additional layer of said resin material impregnating and covering said fiber glass material, a layer of a mat formed from at least one of the group consisting of fibrous crocidilite, asbestos, and polyvinyl chloride-acrylonitrile copolymer covering said second resin layer, and another layer of said resin material impregnating and covering said mat layer.

2. The combination according to claim 1 characterized in that a coating of a primer material is applied to the last-mentioned one of said resin layers.

3. The combination according to claim 1 characterized in that a laminated coating structure of alternating layers of said fiber glass and said resin materials is adhered to said core structure, and the outermost one of said layers is covered by a resin-impregnated mat layer, said mat being formed from at least one of the group consisting of fibrous crocidilite, asbestos, and polyvinyl chloride-acrylonitrile copolymer.

4. In a roll for use in a corrosive environment, said roll including a core structure forming part thereof, a laminated covering on said core structure including layers of fiber glass material and said mat, said mat being the outermost one of said layers, and corrosion-resistant coating means impregnating said fiber glass material and said mat and adhering said layers to one another and to said core structure.

5. The combination according to claim 4 characterized in that a layer of corrosion-resistant resilient material covers said laminated structure.

6. The combination according to claim 5 characterized further in that said resilient material is polychloroprene, and means are provided for adhering said polychloroprene to said coating means.

7. The combination according to claim 6 characterized further in that said adhering means includes at least one coat of a primer material applied to said coating means and a coat of a cement material applied to said primer coat.

8. A roll for use in a corrosive environment, said roll including a core structure forming part thereof, a layer of corrosion-resistant resin material adhered to said core structure, a layer of mat material formed from at least one of the group consisting of fibrous crocidilite, asbestos, and polyvinyl chloride-acrylonitrile copolymer adhered to said resin layer, a second layer of said resin material impregnating and covering said mat, and a layer of elastomeric material adhered to said second resin layer.

9. A roll for use in a corrosive environment, said roll including a core structure forming part thereof, a layer of corrosion-resistant resin material adhered to said core structure, a layer of mat material formed from at least one of the group consisting of fibrous crocidilite, asbestos, and polyvinyl chloride-acrylonitrile copolymer adhered to said resin layer, a second layer of said resin material impregnating and covering said mat, and a coating of a primer material on said second layer of resin material.

10. The combination according to claim 9 characterized adhered in that a coating of cement material is adhered to said primer coating, and a layer of acid-resistant polychloroprene is adhered to said cement coating.

11. A composite abrasion and corrosion resistant structure comprising a base member, a reinforced polyester resin coating adhered to said base member, a reinforcing mat of fibrous material covering and partially embedded in said resin, said fibrous material being selected from the group consisting of polyvinyl chloride copolymer and fiber glass a second coating of said resin covering and partially impregnating said mat, and a layer of polychloroprene rubber adhered to said second coating.

12. A composite abrasion and corrosion resistant structure comprising a base member, member including a relatively hard acid-resistant resin layer selected from the group consisting of polyester, phenolic and epoxy resins, a substantially coextensive mat of fibrous material adhered to and embedded in said layer selected from the group consisting of fiber glass and fibers of polyvinyl chloride copolymer, polyacrylonitrile, polyester, polyamide, asbestos, and crocidilite, and an errosion-resistant elastomeric material covering adhered to said resin layer.

13. The combination according to claim 12 characterized in that said elastomeric material is selected from the group consisting of silicone, polyurethane, polychloroprene, chlorosulfonated polyethylene, butyl, ethylene-propylene-cyclopentadiene copolymer, butadiene, and natural rubbers.

14. A composite abrasion and corrosion resistant structure comprising a base member, a reinforced plastic covering adhered to said base member, a reinforcing fibrous material embedded in said resin, said fibrous material consisting of polyacrylonitrile, and a layer of elastomeric material selected from the group consisting of butyl and chlorosulfonated polyethylene rubbers.

15. A composite abrasion and corrosion resistant structure comprising a base member, reinforced polyester resin coatings adhered to said base member, a coextensive reinforcing fibrous mat embedded in an adjacent pair of said coatings, said fibrous mat being formed from a fibrous material selected from the group consisting of polyvinyl chloride acrylonitrile copolymer and crocidilite, and a layer of elastomeric material selected from the group consisting of chlorosulfonated polyethylene and polychloroprene rubber adhered to the outermost one of said coatings.

16. A roll for use in a corrosive environment, said roll including a core structure having a generally cylindrical work surface, a plastic coating adhered to said core structure including end portions thereof, a coextensive mat of fibrous material reinforcing said coating, and an elastomeric material covering adhered to that part of said plastic covering which covers said work surface.

17. The combination according to claim 16 wherein a second plastic coating covers and partially impregnates said mat, a second lighter weight mat of fibrous material covers said second plastic coating, and a third plastic coating covers and impregnates said lighter weight mat.

18. The combination according to claim 17 wherein a coextensive section of a cloth of fibrous material covers said third plastic coating, and a fourth plastic coating covers and impregnates said cloth.

19. A composite abrasion and corrosion resistant structure comprising a base member, a number of plastic coatings selected from the group consisting of polyester, phenolic and epoxy resins and adhered to said base number, a substantially coextensive mat of fibrous reinforcing material selected from the group consisting of fiber glass and fibers of polyvinyl chloride copolymer, polyacrylonitrile, polyester, polyamide, asbestos, and crocidilite said mat being embedded in an adjacent pair of said coatings, and a layer of nitrile rubber adhered to the outermost one of said coatings.

20. A composite abrasion and corrosion resistant structure comprising a base member, a plastic coating selected from the group consisting of polyester, phenolic and epoxy resins, a substantially coextensive mat of fibrous reinforcing material covering and partially embedded in said coating, said fibrous material being selected from the group consisting of fiber glass and fibers of polyvinyl chloride copolymer, polyacrylonitrile, polyester, polyamide, asbestos and crocidilite, a second plastic coating covering and partially impregnating said mat, and a layer of butadiene rubber adhered to said second coating.

21. A composite abrasion and corrosion resistant structure comprising a base member, a plastic coating selected from the group consisting of polyester, phenolic and epoxy resins and adhered to said base member, said coating being reinforced with a substantially coextensive mat of fibrous material selected from the group consisting of fiberglass and fibers of polyvinyl chloride copolymer, polyacrylonitrile, polyester, polyamide, asbestos, and crocidilite said mat being adhered to and partially embedded in said coating, a second plastic coating covering and partially impregnating said mat, and a layer of natural rubber adhered to said second coating.

22. A composite abrasion and corrosion resistant structure comprising a base member, said member including a relatively hard acid-resistant resin layer adhered to said base member, a coextensive reinforcing mat of fibrous material adhered to and embedded in said resin layer, a second resin layer bonded to said reinforcing mat and to said first-mentioned resin layer, and an erosion-resistant elastomeric material bonded to said second resin layer.

23. The combination according to claim 22 characterized in that said base member is provided with a laminated structure of successive layers of said resin, and in that each of said layers has a reinforcing mat embedded therein.

24. A steel mill roller, comprising a metal core, a rubber cover, and a protective layer of hard reinforced plastic interposed between said rubber cover and said metal core which is resistant to mineral acids and does not propagate cut or crack growth.

25. A roller according to claim 24, wherein said protective layer is made up of fibrous glass reinforced polyester resin.

26. A polyurethane rubber covered roll, comprising a metal roll core, a fiber layer impregnated with a thermosetting resin and wrapped on and united to the periphery of said core, and a polyurethane rubber layer encircling and united to said fiber layer.

* * * * *

UNITED STATES PATENT OFFICE
CERTIFICATE OF CORRECTION

Patent No. 3,646,651     Dated March 7, 1972

Inventor(s) Robert S. Mc Gaughey, et. al.

It is certified that error appears in the above-identified patent and that said Letters Patent are hereby corrected as shown below:

Column 2, line 28, "polyhexamathyline" should read -- polyhexamethylene -- ; line 61, cancel "form the" ; line 66, "Thiokal" should read -- Thiokol -- .  Column 3, line 5, "singe" should read -- single -- .  Column 4, line 45, "carried" should read -- varied -- .  Column 8, lines 34-35, cancel "adhered" ; line 47, after "member," insert -- said -- .

Signed and sealed this 12th day of December 1972.

(SEAL)
Attest:

EDWARD M. FLETCHER, JR.            ROBERT GOTTSCHALK
Attesting Officer                  Commissioner of Patents

REEXAMINATION CERTIFICATE (961st)

United States Patent [19]

McGaughey et al.

[11] B1 3,646,651

[45] Certificate Issued  Dec. 13, 1988

[54] ABRASION AND CORROSION RESISTANT COMPOSITE STRUCTURAL MATERIALS AND THE LIKE

[75] Inventors: Robert S. McGaughey, Indiana; Paul Simboli, Pittsburgh, both of Pa.

[73] Assignee: McCreary Tire & Rubber Company, Indiana, Pa.

Reexamination Request:
No. 90/000,965, Mar. 10, 1986

Reexamination Certificate for:
Patent No.: 3,646,651
Issued: Mar. 7, 1972
Appl. No.: 505,692
Filed: Oct. 29, 1965

Certificate of Correction issued Mar. 7, 1972.

[51] Int. Cl.$^4$ .................................................. B21B 31/08
[52] U.S. Cl. .......................................... 29/130; 29/132
[58] Field of Search .................................. 29/130, 132

[56] References Cited

U.S. PATENT DOCUMENTS

| | | |
|---|---|---|
| 2,589 | 4/1842 | Creasey . |
| 4,244 | 10/1845 | Urny . |
| 59,580 | 11/1866 | Forsyth . |
| 387,647 | 8/1888 | Lang . |
| 989,845 | 4/1911 | Harding . |
| 1,236,317 | 8/1917 | Kempshall . |
| 1,528,956 | 3/1925 | Smith . |
| 1,820,338 | 4/1930 | Youngchild et al. . |
| 1,996,741 | 4/1935 | Benge . |
| 2,120,875 | 6/1938 | Tatnall . |
| 2,152,612 | 3/1939 | Tischer . |
| 2,157,440 | 5/1939 | Streckfus et al. . |
| 2,178,421 | 10/1939 | Freedlander . |
| 2,272,532 | 2/1942 | Shriver . |
| 2,312,853 | 3/1943 | Toland et al. . |
| 2,343,551 | 3/1944 | Harkins . |
| 2,358,535 | 2/1945 | Bacon . |
| 2,597,858 | 5/1952 | Freedlander . |
| 2,614,058 | 10/1952 | Francis . |
| 2,625,735 | 1/1953 | Hitov . |
| 2,699,402 | 1/1955 | Meyer . |
| 2,706,166 | 4/1955 | Gurney . |
| 2,792,324 | 5/1957 | Daley et al. . |
| 2,801,189 | 7/1957 | Collier . |
| 2,850,424 | 9/1928 | Finelli et al. . |
| 2,900,292 | 8/1959 | Coleman, Jr. et al. . |
| 2,902,398 | 9/1959 | Schroeder . |
| 2,943,009 | 6/1960 | Mirsky et al. . |
| 2,976,202 | 3/1961 | Salem et al. . |
| 3,002,866 | 10/1961 | Gartrell et al. . |
| 3,030,249 | 4/1962 | Schollenberger et al. . |
| 3,032,460 | 5/1962 | Chipman et al. . |
| 3,036,948 | 5/1962 | Danielson . |
| 3,042,545 | 7/1962 | Kienle et al. . |
| 3,042,995 | 7/1962 | Birkin . |
| 3,091,173 | 5/1963 | Koch . |
| 3,141,817 | 7/1964 | Collins et al. . |
| 3,147,698 | 9/1964 | Ross . |
| 3,184,355 | 5/1965 | Brown . |
| 3,193,437 | 7/1965 | Schafer . |
| 3,255,069 | 6/1966 | Crowley et al. . |
| 3,293,728 | 12/1966 | Hill . |
| 3,349,693 | 10/1967 | Mitchell, Jr. . |
| 3,352,955 | 11/1967 | Pigott et al. . |
| 3,396,063 | 8/1968 | Massoubre . |
| 3,423,270 | 1/1969 | Heins . |
| 3,425,886 | 2/1969 | Heins . |
| 3,445,906 | 5/1969 | Mitchell, Jr. . |
| 3,447,949 | 6/1969 | Singer . |
| 3,502,542 | 3/1970 | Wenisch . |

FOREIGN PATENT DOCUMENTS

| | | |
|---|---|---|
| 216331 | 12/1960 | Austria . |
| 550800 | 4/1932 | Fed. Rep. of Germany . |
| 829354 | 12/1951 | Fed. Rep. of Germany . |
| 889424 | 7/1953 | Fed. Rep. of Germany . |
| 970339 | 8/1958 | Fed. Rep. of Germany . |
| 1069040 | 11/1959 | Fed. Rep. of Germany . |
| 1141437 | 12/1962 | Fed. Rep. of Germany . |
| 1914133 | 4/1965 | Fed. Rep. of Germany . |
| 1229548 | 12/1966 | Fed. Rep. of Germany . |
| 1807331 | 6/1970 | Fed. Rep. of Germany . |
| 1197035 | 6/1959 | France . |
| 1274842 | 9/1961 | France . |
| 1278030 | 10/1961 | France . |
| 1297969 | 5/1962 | France . |
| 9621 | 8/1951 | Japan . |
| 1678 | 7/1969 | Sweden . |
| 468400 | 7/1937 | United Kingdom . |
| 470932 | 8/1937 | United Kingdom . |
| 470956 | 8/1937 | United Kingdom . |
| 586626 | 4/1947 | United Kingdom . |
| 649687 | 1/1951 | United Kingdom . |
| 762453 | 11/1956 | United Kingdom . |
| 804667 | 11/1958 | United Kingdom . |
| 823577 | 11/1959 | United Kingdom . |
| 851715 | 10/1960 | United Kingdom . |
| 895420 | 5/1962 | United Kingdom . |
| 986734 | 6/1962 | United Kingdom . |
| 927716 | 6/1963 | United Kingdom . |
| 964375 | 7/1964 | United Kingdom . |
| 986734 | 3/1965 | United Kingdom . |
| 1013039 | 12/1965 | United Kingdom . |
| 1046584 | 10/1966 | United Kingdom . |
| 1118447 | 7/1968 | United Kingdom . |

OTHER PUBLICATIONS

"Epoxy Resins in Anti-Corrosive Applications", Dunn, Corrosion Technology, Aug. 1959, pp. 223-226.
"Tough, Chemical Resistant Urethane Coatings", Sansone, *Materials in Design Engineering*, Jun. 1959, pp. 80-83.
*Encyclopedia of Polymer Science and Technology*, (John Wiley & Sons, 1967), p. 222.
Handbook of Reinforced Plastics, The Society of the Plastics Industry, Inc., S. Oleesky et al, pp. 74-75.

*Primary Examiner*—Mark Rosenbaum

[57] ABSTRACT

Structural materials, specifically rolls for use in steel-fabricating processes, are disclosed for use in corrosive and erosive environments. In one arrangement the roll includes a base member or substrate to which is adhered a resin coating. A reinforcing mat or cloth is adhered to and partially embedded in the resin coating, before the latter hardens. A second resin layer is coated upon and partially impregnates the reinforcing mat. A second mat is then adhered to the second resin layer in a similar manner followed by a third coating of the resin material. A greater or lesser number of resin layers and reinforcing mats can be employed as required. The specific materials employed for the resin or plastic layers and the reinforcing cloths or mats can be varied according to the specific environment in which the roll will be used. For example, in presence of hydrofluoric acid the reinforcing mat may be Dynel cloth. For resilient contact with the work a suitable elastomeric layer is placed over the last resin or plastic coating.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–26 are cancelled.

* * * * *